United States Patent
Winkler et al.

[15] 3,676,412
[45] July 11, 1972

[54] METHOD FOR PREPARING RESIN FEED

[72] Inventors: John C. Winkler; Corley P. Senyard, both of Baton Rouge, La.

[73] Assignee: Esso Research and Engineering Company, Linden, N.J.

[22] Filed: Aug. 12, 1970

[21] Appl. No.: 63,311

Related U.S. Application Data

[63] Continuation of Ser. No. 800,803, Jan. 28, 1969, abandoned, which is a continuation-in-part of Ser. No. 462,886, June 10, 1965, abandoned.

[52] U.S. Cl. ............................................................. 260/82
[51] Int. Cl. .......................................................... C08f 1/72
[58] Field of Search ...................................................... 260/82

[56] References Cited

UNITED STATES PATENTS

| | | |
|---|---|---|
| 2,894,937 | 7/1959 | Banes et al. ........................... 260/82 |
| 2,946,775 | 7/1960 | De Vries et al. ......................... 260/82 |
| 2,994,689 | 4/1961 | Banes et al. ........................... 260/82 |
| 3,334,061 | 8/1967 | House et al. ......................... 260/33.6 |

OTHER PUBLICATIONS

Introduction to Organic Chemistry, Lowy and Harrow (1954) pg. 4.

Primary Examiner—Joseph L. Schofer
Assistant Examiner—Stanford M. Levin

[57] ABSTRACT

A steam-cracked stream boiling in the 200°–500° F. range is fractionated into two fractions, one boiling above and the other below 410° F. The heavier fraction is discarded and the lighter fraction is again fractionated to separate it into a fraction boiling 290°–410° F. and a fraction boiling below 290° F. Low boiling naphthas boiling 30°–300° or 400° F. are preferably added to the lighter fractions from each fractionation step. A $C_5$–$C_6$ fraction is obtained by fractionating the overhead from the second fractionator and is heat soaked to remove the cyclodiene monomers prior to Friedel-Crafts polymerization.

4 Claims, 2 Drawing Figures

PATENTED JUL 11 1972 3,676,412
SHEET 1 OF 2
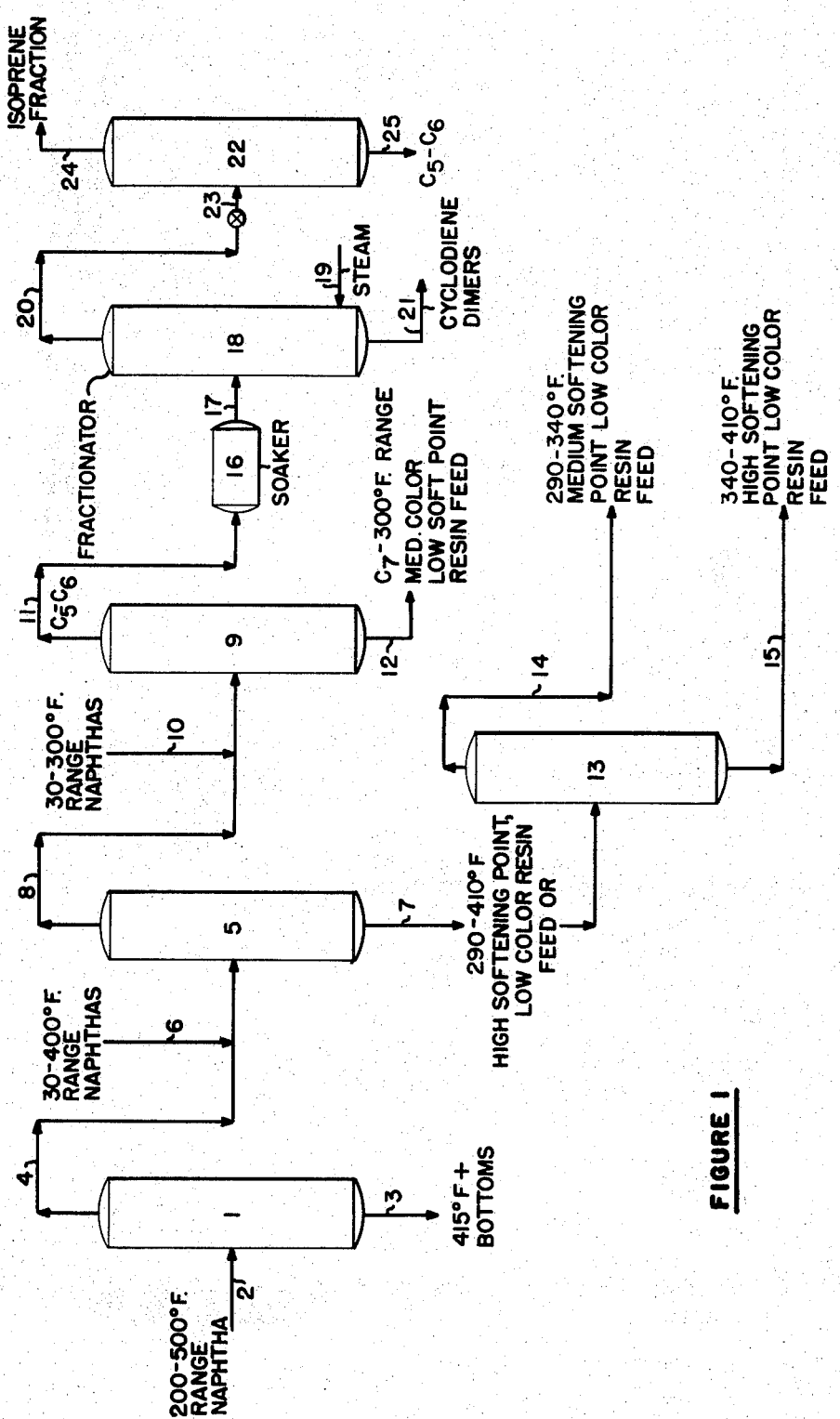
FIGURE 1
John Cecil Winkler
Corley Price Senyard   Inventors
By 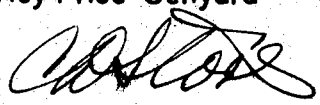
Patent Attorney PATENTED JUL 11 1972
3,676,412
SHEET 1 OF 2
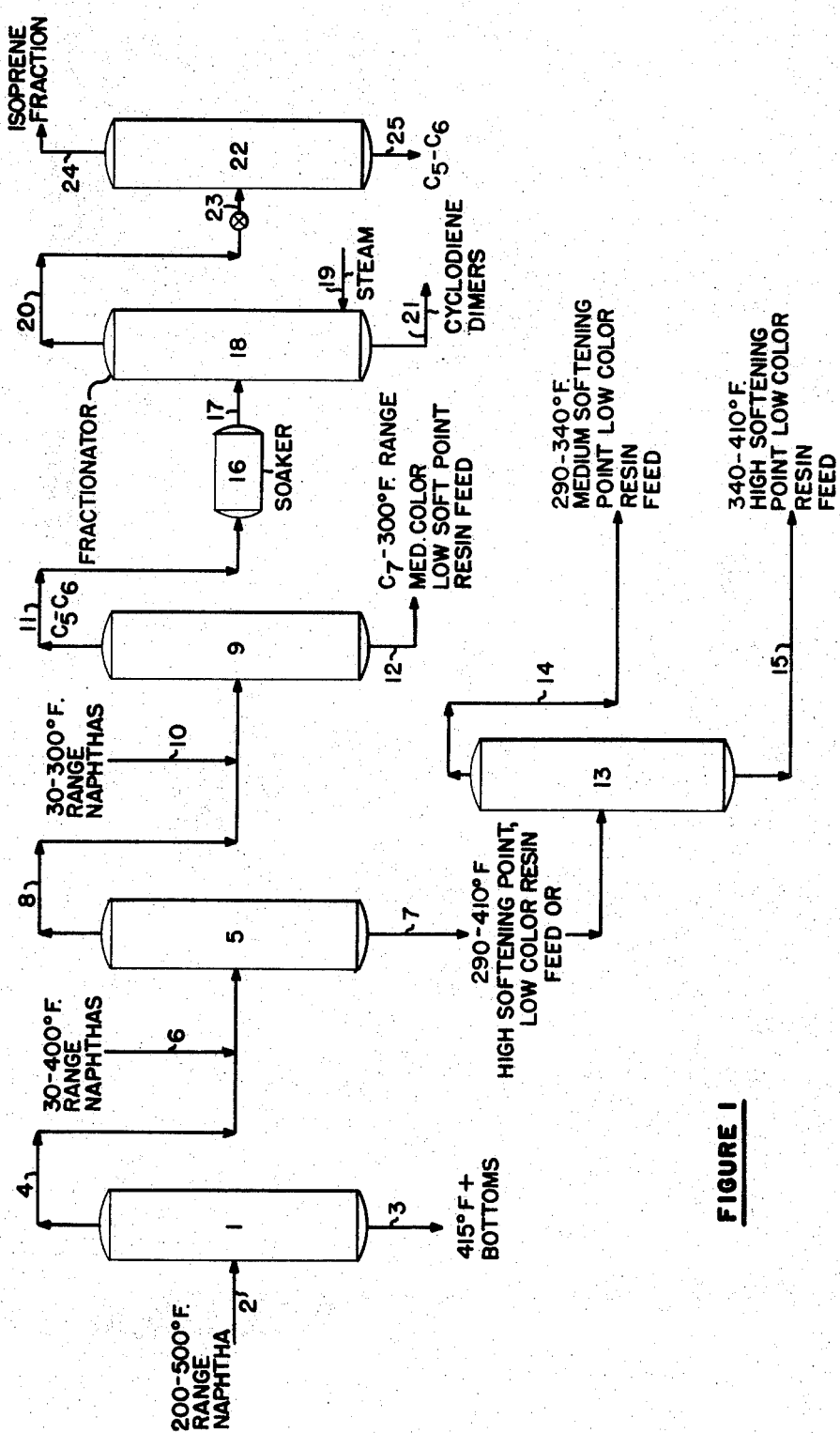
FIGURE 1
John Cecil Winkler
Corley Price Senyard    Inventors
By 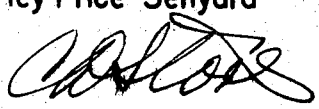
Patent Attorney

METHOD FOR PREPARING RESIN FEED

REFERENCE TO RELATED APPLICATIONS

This is a streamlined continuation of Ser. No. 800,803, filed Jan. 28, 1969 (now abandoned) which in turn is a continuation-in-part of Ser. No. 462,886, filed June 10, 1965 and now abandoned.

BACKGROUND OF THE INVENTION

This invention relates to a method for the preparation of feed stocks for the production of petroleum resins and more particularly relates to a method for fractionating cracked naphtha fractions under particular conditions and sequence to provide improved feeds from which resins having high softening point and low color can be prepared by Friedel-crafts polymerization.

It is known that it is possible to treat steam-cracked distillate streams with polymerization catalysts and thereby produce resins of varying quality and utility. It is known that these cracked fractions contain cyclodienes which contribute to the formation of gel which in turn adversely affects the color, clarity and other properties of the resin. When light fractions are being processed it is a simple matter to dimerize these cyclodienes by a thermal soaking treatment and to separate the dimerized hydrocarbons from the remainder and to use this remainder as the feed to polymerization. Such a process is shown in the patent to Banes et al. (U.S. Pat. No. 2,894,937). However after higher boiling hydrocarbons became desirable as feedstocks for preparing the resins and as the market for substantially colorless resins increased it was found that the most desirable portion of the higher boiling hydrocarbons for polymerization was a fraction boiling 290° to 410° F. Unfortunately this meant that the cyclic dimers and codimers produced by the soaking step would appear in the highly desirable fraction.

The usual practice was to heat soak a $C_5$ to 500° F. or higher boiling fraction and separate out a $C_5$–$C_7$ and a $C_7$–500° F. fraction as resin feeds. It was soon discovered that this method of preparing the $C_7$–500° F. fraction would not yield a light colored resin having desired properties. Instead the resin would be dark and have a green cast.

Subsequent study has revealed that the green cast was due to the presence of naphthalene and other condensed ring aromatics. While resins from the $C_7$–410° F. portion of the $C_7$–500 F. fraction lost the green cast, they were still dark in color, had low softening points, and possessed poor light and heat stabilities.

A 290°–410° F. heart-cut portion of the $C_7$–500° F. fraction yielded a resin of slightly improved color and desired softening point but did not improve stabilities. Removal of cyclodiene dimers and codimers from this heart-cut resulted in a resin of light color, desired softening point, and excellent heat and light stabilities.

For the above reasons it was often the practice not to heat soak the $C_5$ to 500° F. fraction prior to fractionation. However it was discovered that if this feed were stored for any length of time prior to fractionation the monomeric cyclodienes would tend to polymerize during such storage and find their way into the desired 290°–410° F. fraction. Such a scheme is described in the U.S. Pat. to Banes et al. (No. 2,994,689). An analysis of the 90° to 275° C. fraction is given in this patent and fails to show the presence of any cyclodienes monomers in this fraction since most were distilled out with the $C_5$–90° C. fraction. Any small amounts escaping into the heavier fraction were undetectable due to the lack of precision of the analytical instruments of the day. Thus it is obvious that the 90° C.+ fraction was not stored for any length of time prior to further separation and the disadvantages of this method were not realized.

SUMMARY OF THE INVENTION

In accordance with this invention, therefore, it has been found that the above disadvantages can be overcome by fractionating a 200°–500° F. steam-cracked fraction under controlled conditions and sequence to separate out a 290°–410° F. fraction which is free of cyclodienes and is particularly suitable as feed stock for the preparation of high softening point resins.

More specifically this invention provides for the fractionation of the steam-cracked stream into two fractions, one boiling above and the other boiling below 410° F. The heavier fraction contains all of the condensed ring aromatic hydrocarbons, e.g. naphthalenes which impart a green cast to the final resin if they are present in the feed to polymerization. Furthermore, any cyclodiene polymers present will be cracked at this temperature and all of the resulting monomers together with any originally present in the feed will be present in the 410° F. and lighter fraction. The heavier fraction is discarded and the lighter fraction is again fractionated to separate it into a highly desirable fraction boiling 290°–410° F. and a fraction boiling below 290° F. which will contain the cyclodiene monomers. Thus the highly desirable 290°–410° F. fraction contains none of the undesirable cyclodiene monomers. This method of operating affords a specific advantage in that the feed to the first tower is not heat soaked, since the sequence of steps of the fractionation allows the cyclodienes to be eliminated from the highly desired 290°–410° F. fraction and concentrated in a $C_5$–$C_6$ fraction from which they can be removed by heat soaking. Hence the present invention affords the advantage of providing a fraction eminently suitable for preparation of petroleum resins in that the fraction contains no condensed ring aromatics which contribute to color and no cyclodienes which contribute to gel formation, to color, and to poor stability. Thus resins produced from this fraction are low in color and have high softening points.

Thus the improved process of the present invention broadly comprises the steps of cracking petroleum feed streams in the presence of steam, selecting specified fractions from the cracked distillate products by means of a controlled sequence of distillation steps and polymerizing these fractions with Friedel-Crafts catalysts.

BRIEF DESCRIPTION OF THE DRAWINGS

The invention is described in more detail in the accompanying drawings in which

FIG. 1 is a diagrammatic representation of one embodiment of this invention, and FIG. 2 is a diagrammatic representation of another embodiment of this invention.

DESCRIPTION OF THE PREFERRED EMBODIMENTS

Referring therefore to FIG. 1, a fraction boiling 200°–500° F., obtained by cracking a light gas oil or other hydrocarbon fraction having a boiling range of about 185° to 1,000° F. in the presence of 0–95 mole percent steam, preferably 70–85 mole percent at temperatures between about 1,100° and 1,550° F., preferably between about 1,200° and 1,550° F. for a time between 0.05 and 30 seconds, is introduced to the midsection of tower 1 and by line 2.

Typical analyses of feed streams which are particularly useful for introducing into tower 1 are as follows:

| | Weight % (Range) |
|---|---|
| Diolefins | 10–30 |
| Olefins | 10–30 |
| Aromatics | 30–70 |
| Paraffins and Naphthenes | 10–30 |

Tower 1 is operated at 0–10 psig. and at such temperatures that a fraction boiling 200°–410° F. is taken off overhead and a fraction boiling 410° F.–500° F. at the bottom. The bottoms fraction containing naphthalene and other green color bodies is withdrawn through line 3 and discarded. The overhead fraction is withdrawn through line 4 and passed to the midsection of tower 5. If desired, cracked naphthas boiling below 400° F. and containing 300°–400° F. material may be blended with this fraction by line 6 in any desired ratio. Tower 5 is maintained under essentially atmospheric pressure or preferably under vacuum of 25–27 inches of Hg and at a temperature sufficient to withdraw a bottoms fraction boiling 290°–410° F. through line 7 and an overhead boiling 30°–290° F. overhead through line 8 (or 200–290° F. if naphtha is not added through line 6). The overhead fraction is passed to the midsection of tower 9. A naphtha fraction boiling below 290° F. may be added to said overhead through line 10, if desired, in any desired proportions. Tower 9 is operated at a pressure between 0 and 10 psig. and at a temperature adapted to take a $C_5$–$C_6$ fraction overhead through line 11 and a bottoms fraction boiling $C_7$ – 300° F. by line 12.

The bottoms fraction removed from tower 5 through line 7 may be further fractionated if desired by introducing it into the midsection of tower 13. This tower is operated under 25–27 inches of Hg and a temperature so that a fraction boiling 290°–340° F. is taken overhead through line 14 and a bottoms fraction 340°–410° F. is taken off through line 15.

The overhead $C_5$–$C_6$ fraction flowing in line 11 is passed to thermal soaker 16 where it is subjected to a temperature of 200°–220° F. for 4 to 8 hours for selective dimerization of cyclopentadiene and methyl-cyclopentadiene. The soaked liquid product is discharged from soaker 16 by line 17 into an intermediate part of fractionator 18 for separating resulting dimers mainly in the $C_{10}$ to $C_{12}$ range. With about 30 plates in column 18, a pressure of the order of 0 to 5 psig. may be maintained therein, and steam is preferably injected near the bottom, by line 19. Vapors are taken overhead by line 20 at about 160° to 170° F. while the temperature of the bottoms is maintained in the range of 260° to 300° F. The cyclodiene dimer produce of $C_{10}$ to $C_{12}$ range is the bottom product withdrawn by line 21.

Fractionating column 22 receives overhead vapors or distillate from column 18 through line 23 when it is desired to separate an isoprene-containing fraction for recovery of pure isoprene. Column 22 is provided with about 50 plates, receives feed to about the 30th–35th plate, and is operated preferably under 30–35 psig. to distill overhead vapors through line 24 at temperatures of 140° to 150° F. The bottoms can be heated in column 22 to temperatures of 225° to 235° F. Bottoms from column 22 are withdrawn through line 25.

Referring now to FIG. 2 a feed boiling 200°–500° F. is fractionated in tower 1 and 5 exactly as described in FIG. 1. The overhead from tower 5, boiling 30 to 290° F., withdrawn through line 8, is passed directly to the soaker 30, with or without the addition of naphtha boiling 30–300° F. through line 10. The conditions maintained in soaker 30 are the same as those in soaker 16 of FIG. 1. The soaked liquid product is discharged from soaker 30 by line 31 and passed into an intermediate part of fractionator 32 for separating resulting dimers mainly in the $C_{10}$ to $C_{12}$ range. The conditions in tower 32 are maintained substantially the same as in tower 18 of FIG. 1, steam being introduced through line 33, the dimers being drawn off as bottoms through line 34. The overhead from tower 32 is introduced by line 35 into the midsection of tower 36 which is operated under the same conditions as tower 22 in FIG. 1 so as to take an isoprene-enriched stream overhead through line 37. Bottoms from column 36 boiling in the range of about 85° to 290° F. are withdrawn through line 38 and passed to the midpoint of tower 39. This tower is operated under the same conditions as tower 9 in FIG. 1 so as to take overhead a $C_5$–$C_6$ fraction through line 40 and a $C_7$ to 290° F. bottoms fraction through line 41.

The bottoms fraction from tower 5, the bottoms fraction from tower 22, the overhead from tower 39, and the overhead and bottoms fractions from tower 13 are suitable as feed to resin polymerization. Each of these fractions can be polymerized at temperatures in the range of −20° to +200° F. and preferably from +41° to +170° F.

In carrying out a continuous or batch operation, there is preferably employed an inert diluent such as benzene, naphtha, paraffins, cycloparaffins or other hydrocarbon fractions preferably boiling in the range of 160° to 290° F. The diluent may be employed in amounts from 5–75 percent by weight based on the olefin-containing feed. However, diluent may be dispensed with if so desired. If used the diluent may be added first, last or at the same time as the feed. The reactor should comprise means for agitating the reaction mixture and the feed is preferably agitated during the addition of the catalyst and during the entire reaction time. Preferably the catalyst is added slowly over a period of 5 minutes to 1 hour or until the desired catalyst concentration has been reached. The temperature of the reaction mixture may be controlled by any known technique, a particularly preferred one is referred to normally as a pump-around system where the reaction mixture is continuously circulated through a temperature-controlling batch adapted to either heat or cool the mixture. After the start up on the reaction, the catalyst is continuously added at a rate to give the desired catalyst concentration together with fresh steam-cracked hydrocarbon feed. In a continuous system, a portion of the reaction mixture is continuously drawn off to a second vessel either batchwise or continuously. One technique for carrying out a batch reaction comprises forming a slurry of the catalyst in diluent and then slowly adding the steam cracked feed. The mixture is continuously agitated. If desired, only a portion of the catalyst is added initially and the remainder after the reaction is started. The product mixture is then quenched, washed and stripped to give the final resin product. The reaction mixture may be quenched with caustic soda, soda ash, ammonia, alcohol, or the like to stop the reaction. Water soluble non-ionic wetting agents such as alkyl polyethers, etc., may also be employed. These are all well known in the art. Subsequent to the quench, the produce is usually water and/or alkali washed to remove any residual acidity. Subsequent to the washing, the resin solution is then stripped of diluent, unreacted hydrocarbon and any low molecular weight polymer to give the hard resin product. The stripping may be carried out in accordance with well-known techniques by vacuum or steam distillation. For example, hard resins are conveniently recovered by stripping to a bottoms temperature to about 520° F. at 2–5 mm. Hg. or the solution may be steam stripped for about 2 hours at 500° F. While the softening point may be raised by increasing the severity and/or time of stripping, this only results in relatively small increases in softening point and is accompanied by a loss in resin yield with a corresponding increase in undesired liquid polymer.

The various fractions obtained as described above are composed of a mixture of olefins, diolefins, paraffins and aromatics in the proportions shown in the following table:

TABLE I

| | 290–410° F. | Fraction $C_5$–$C_6$ | 200–290° F. | 300–340°F. | 340–410° F. |
|---|---|---|---|---|---|
| Olefins | | | | | |
| specific | 2 | 22 | 20 | 4 | 2 |
| general | 0–10 | 10–40 | 10–30 | 0–10 | 0–10 |
| Diolefins | | | | | |
| specific | 2 | 21 | 3 | 1 | 3 |
| general | 0–4 | 10–40 | 1–5 | 0–2 | 0–6 |
| Paraffins | | | | | |
| specific | 10 | 5 | 3 | 10 | 5 |
| general | 0–20 | 0–10 | 0–10 | 5–15 | 0–10 |
| Aromatics | | | | | |
| specific | 86 | 52 | 80 | 85 | 90 |
| general | 70–95 | 30–70 | 50–90 | 65–85 | 85–95 |

The 290°–410° F. bottoms fraction is a heart cut fraction which upon polymerization with Friedel-Crafts catalysts gives a high softening point, low color resin.

The 290°–340° F. fraction upon polymerization yields a medium softening point resin having very low color.

The 340°–410° F. fraction gives upon polymerization a very high softening point, and low color resin.

The C₅–C₆ fraction from which the cyclodienes and isoprene have been removed gives a low color, low softening point resin.

Thus the present invention affords a method for fractionating cracked naphtha stocks under specific conditions and sequence to provide improved feeds for the production of high softening point, low color petroleum resins.

The advantages of this invention will be better understood from a consideration of the following experimental data and the drawings which are given for the sake of illustration, but without intention of limiting the invention thereto.

EXAMPLE 1

A steam-cracked naphtha boiling in the 200°–500° F. range was subjected to an atmospheric laboratory distillation with 15 theoretical plates at a 5/1 reflux ratio, known as 15/5 distillation. Two fractions were obtained: (1) an overhead fraction boiling 200°–410° F. and a bottoms fraction boiling 410° to 500° F. The latter fraction contained all of the naphthalene and green color bodies and was discarded. A portion of the overhead and original fractions were polymerized with BF$_3$ at 90° F. for 30 minutes. The excess catalyst was removed by alcohol addition followed by water washing, and the resin recovered by distillation. The following data show the comparison between the yields, softening point and color of the respective resins:

|  | Fractions | |
|---|---|---|
|  | 200–500°F | 200–410°F |
| Weight % (based on 200–500°F. fraction) | 100 | 81.8 |
| Resin yield, weight % | 36.5 | 35.0 |
| Resin softening point, °C.* | 125 | 120 |
| Resin color, gardner | 15 | 12 |

*Standard Ring and Ball Method.

The above data show that while some loss in softening point and yield result from the removal of the 200°–410° F. portion of the original naphtha stream, a lighter colored resin is obtained because of the removal of naphthalenes and green color bodies which remain in the 410°–500° F. fraction.

EXAMPLE 2

The 200°–410° F. fraction obtained in Example 1 was blended with a 30°–400° F. boiling range steam-cracked naphtha fraction in proportion of 60 parts by weight of the 200°–410° F. fraction and 40 parts of the naphtha stream. This mixture was distilled as in Example 1 under atmospheric pressure and under a vacuum of 100 mm Hg. pressure. An overhead fraction boiling 30°–290° F. and a bottoms fraction boiling 290°–410° F. were obtained in each distillation. Each of the bottoms fractions was polymerized with BF$_3$ as described in Example 1. Resin yield and quality of the resin are shown in the following table:

|  | 290–410°F. Fraction | |
|---|---|---|
|  | Atm. Distn. | 100 mm. Hg. Distn. |
| Weight % (based on 200–410°F. naphtha) | 40.0 | 40.3 |
| Resin, weight % | 52.2 | 55.5 |
| Resin, softening point, °C.* | 138 | 145 |
| Resin color, Gardner | 10 | 9 |

*Ring and Ball

The above data show that the higher still temperature necessary for distillation at atmospheric pressure results in a drop in resin-yield and softening point. This is due to the heat-soaking and/or cracking of cyclodienes and olefins in the 200°–410° F. fraction. The data also show that the yield of resin from the 290°–410° F. fraction is greater (52–55.5 weight percent) than that obtained from the 200°–410° F. fraction (35.0 weight percent) in Example 1. This is due to the removal of lower resin content material in the 200°–290° F. range material. The decrease in color is due to the removal of dark colored bodies in the 200°–290° F. fraction.

EXAMPLE 3

The 290°–410° F. fraction obtained from the vacuum distillation in Example 2 was distilled as in Example 1 under 100 mm. Hg. into approximately half overhead and half bottoms cuts, and each of the fractions polymerized with BF$_3$ as described in Example 1. The following data were obtained:

|  | 290–340°F. | 340–410°F. |
|---|---|---|
| Fraction, height percent | 50 | 50 |
| Resin yield, weight percent | 53 | 57 |
| Resin softening point* | 139 | 150 |
| Resin color, Gardner | 8 | 12 |

*Ring and Ball

The above data illustrate the possibility of distilling the 290°–410° F. fraction into two fractions, one which gives a very low color resin with acceptable softening point and the other with a very high softening point with acceptably low color.

EXAMPLE 4

The overhead fraction from Example 2 boiling 30°–290° F. was blended with a steam-cracked naphtha fraction boiling 30–300° F. in proportions of 20 weight percent of the 30–300° F. naphtha fraction and 80 weight percent of the 30–300° F. fraction. The blend was heat soaked at 200–220° F. for 4 to 8 hours to dimerize cyclodienes. The resulting polymers were removed by distillation and the resulting product distilled to remove most of the isoprene. The isoprene and cyclodiene-free fraction was subjected to a 15/5 atmospheric laboratory distillation as described in Example 1, and a C₅–C₆ fraction taken overhead and a C₇–300° F. fraction taken from the bottom. Each of these fractions was polymerized with AlCl$_3$, using 1 percent AlCl$_3$ (based on sample) at 35°–40° C. for 30 minutes. The sample was soaked an additional 30 minutes, then stripped under 5 mm. Hg. pressure to 430° F. bottoms temperature. Resin yields and quality are shown for each fraction in the following data:

|  | C₅–C₆ | C₇–300°F. | Original C₅–300°F. |
|---|---|---|---|
| Fraction weight percent | 80.0 | 20 | 100 |
| Resin yield, weight percent | 30.0 | 18.9 | 32.3 |
| Resin softening point, °C.* | 90 | 84 | 105 |
| Resin color, Gardner | 8 | 14.5 | 10.5 |

*Ring and Ball

The above data show the necessity of removing the C₇–300° F. fraction since it contains low softening point, high color resin components.

EXAMPLE 5

A low pressure distillate fraction boiling 200°–450° F. was divided into three fractions, one boiling 200°–300° F., another 300°–400° F. and a third boiling above 400° F. Each of these fractions as well as the original low pressure distillate was polymerized with BF$_3$ as described in Example 1 and the following data obtained.

Resin Yield and Properties of Three Fractions From Low Pressure Distillate(1)

| Inspections | Orig. LPD | 200–300°F Fraction | 300–400°F Fraction | 400°F + Fraction |
|---|---|---|---|---|
| °API at 60°F | 27.9 | 34.0 | 25.2 | 9.4 |
| Fraction, wt. % (of original) | 100.0 | 49.5 | 27.1 | 23.4 |
| Resin yield at 115°F C.P., wt.% | 37.4 | < 10.0 | 42.5 | 57.4 |
| Resin S.P., °C | 121 | 79.0 | 106 | 100 |
| Resin color, gardner | 14 | >16 | 7.5 | >16 |

(1) LPD used was Tk. 744 sample of 1/28/63.

The above data show that the 300°–400° F. heart-cut fraction gave a resin very low in color and having a high softening point. As shown in Example 2 broadening the 300°–400° F. to 290°–410° F. gave a much higher softening point resin with only slight increase in color.

Summarizing the present invention, it is clear that problems involved in the preparation of low-colored high softening point resins from high boiling fractions have been overcome by the discovery that naphthalene and other condensed ring aromatics are the cause of the green cast and by the further discovery that cyclodiene monomers and polymers were finding their way into the desired fraction giving higher colored resins on polymerization. It was also discovered as shown by Example 5 that the material boiling below 300° F. was dark in color, low in softening point and yield. Once these discoveries were made a fractionation scheme to avoid these difficulties was developed which the above examples show results in the preparation of hard resins having commercially acceptable color.

The nature of the present invention having been thus fully set forth and specific examples of the same given, what is claimed as new and useful and desired to be secured by Letters Patent is:

1. A process for producing feeds suitable for preparing resins of high softening point and low color which comprises:
   a. obtaining a naphtha fraction having a boiling point range of 200° to 500° F. by cracking a light gas oil having a boiling point range of about 185° to 1,000° F. at a temperature of 1,100° to 1,550° F. in the presence of 0–95 mole percent steam for a time between 0.05 and 30 seconds;
   b. removing naphthalenes and other condensed ring aromatics from said naphtha fraction and cracking any cyclodiene polymer present in said fraction to its monomer by distilling said naphtha fraction into a first overhead fraction boiling below 410° F. and a first bottoms containing naphthalenes and other condensed ring aromatics; and
   c. removing cyclodiene monomer present in said first overhead fraction by subjecting said first overhead fraction to a second distillation to separate a second overhead fraction boiling below 290° F. and containing said cyclodiene monomer and a second bottoms boiling between 290–410°F., said second bottoms being said feed suitable for preparing resins of high softening point and low color; and
   d. polymerizing said second bottoms by contacting with Friedel-Crafts catalyst at a temperature between −20° and 200° F.

2. The process of claim 1 wherein the second distillation is performed at reduced pressure.

3. The process of claim 1 wherein a cracked naphtha fraction boiling between 30°–400° F. is added to said first overhead fraction prior to said second distillation.

4. The process of claim 1 in which the second bottoms fraction is further distilled to separate a third overhead fraction boiling 290°–340° F. and a third bottoms fraction boiling 340°–410° F. wherein the third bottoms fraction and the third overhead fraction are separately polymerized by contacting with Friedel-Crafts catalyst at a temperature between −20° and 200° F.

* * * * *